A. SARGENT.
APPARATUS FOR DIVIDING AND SURFACING STONE.
APPLICATION FILED MAR. 18, 1913.
1,160,452.
Patented Nov. 16, 1915.
2 SHEETS—SHEET 1.
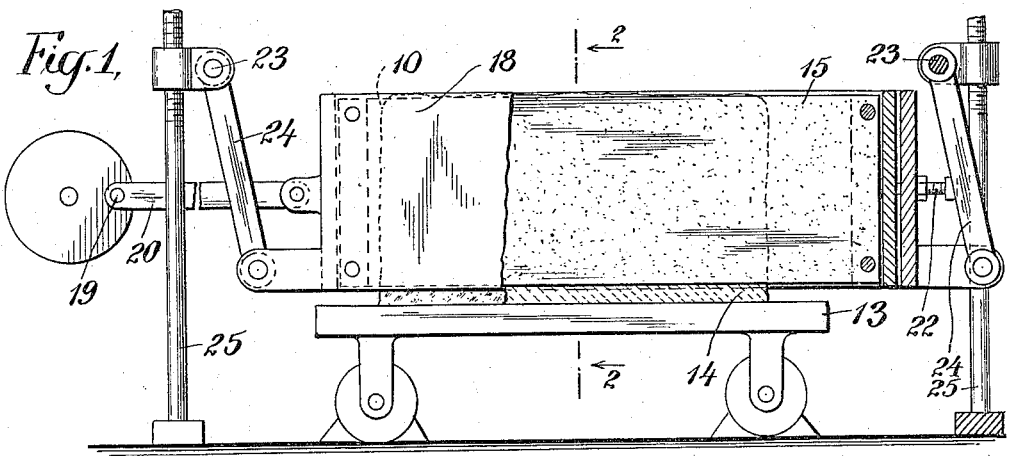
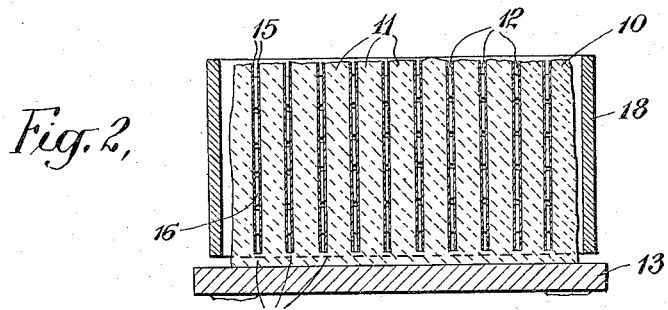
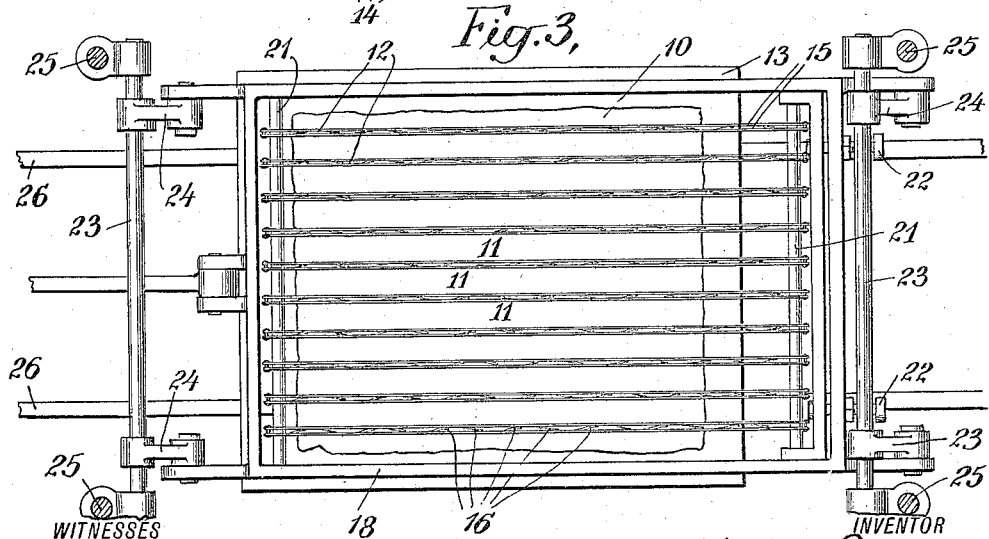
WITNESSES
E. Bradford.
Philip S. McLean.
INVENTOR
Allston Sargent
ATTORNEY A. SARGENT.
APPARATUS FOR DIVIDING AND SURFACING STONE.
APPLICATION FILED MAR. 18, 1913.
1,160,452.
Patented Nov. 16, 1915.
2 SHEETS—SHEET 2.
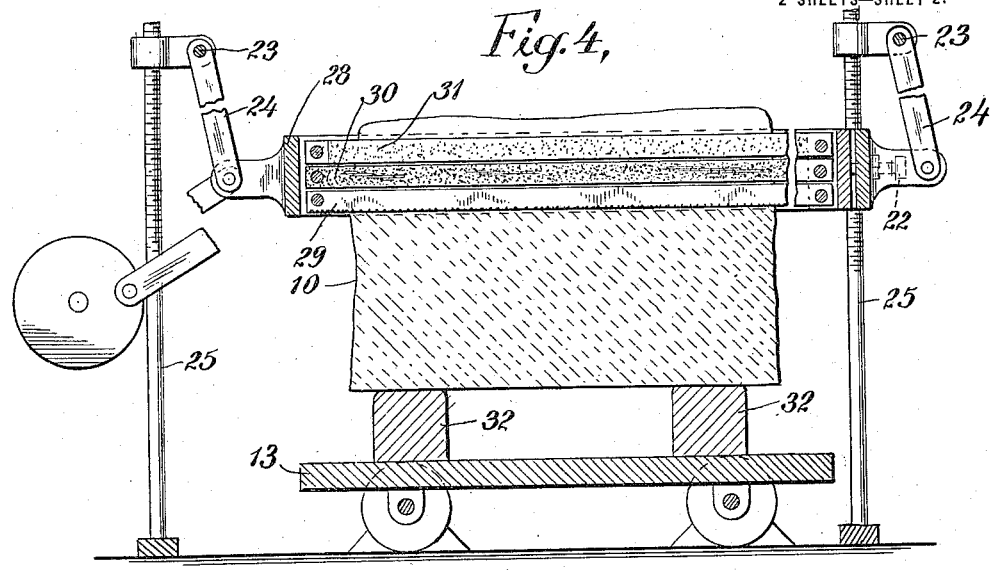
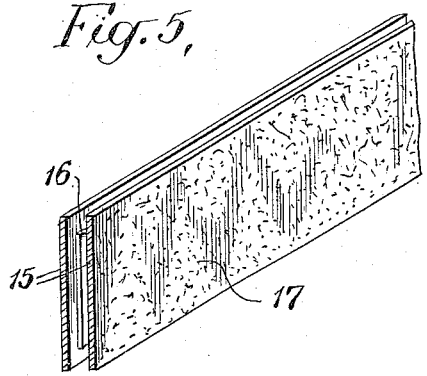
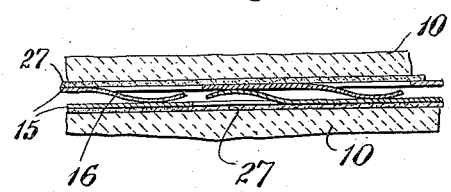
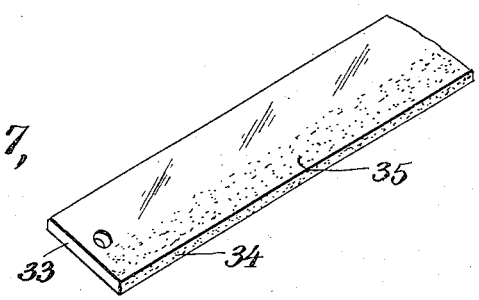
WITNESSES
E. Bradford
Philip S. McLean.
INVENTOR
Allston Sargent
ATTORNEY

UNITED STATES PATENT OFFICE.

ALLSTON SARGENT, OF NEW YORK, N. Y.

APPARATUS FOR DIVIDING AND SURFACING STONE.

1,160,452.　　　　Specification of Letters Patent.　　Patented Nov. 16, 1915.

Application filed March 18, 1913. Serial No. 755,115.

*To all whom it may concern:*

Be it known that I, ALLSTON SARGENT, a citizen of the United States of America, and residing at New York, in the county of New York and State of New York, have invented new and useful Improvements in Apparatus for Dividing and Surfacing Stone, of which the following is a specification.

The usual method of dividing stone such as marble is to cut the body of the stone into slabs or sections by means of a so called "stone saw." The stone saw which is usually employed for this purpose has one or more iron bands which by being reciprocated edgewise back and forth across the body of the stone gradually wear their way through the stone. The wearing or sawing action is facilitated by introducing sand and water beneath the saw band. This saw makes a cut which is more or less irregular and it therefore leaves the sections, when cut apart, with rough faces which must be smoothed down and sometimes polished before the stone is ready for market. The smoothing or surfacing of the stone is usually accomplished by operating a flat grinding wheel in flat engagement with first one face and then the other face of the stone and the polishing is usually accomplished by hand. The sawing, grinding and polishing processes consume considerable time and the transfer of the stone after it has been cut, from the sawing machine to the grinding machine, etc., involves considerable labor and loss of time.

The object of my invention is to accomplish a saving in the time necessary for the sawing and the surfacing of the stone and to reduce the amount of labor ordinarily involved in these operations.

My invention in its broadest aspect consists in surfacing the stone by operating a surfacing device in between two adjoining sections of stone and in contact with the opposing faces of said sections whereby in the one operation to simultaneously surface the two opposing faces of the adjoining stone sections.

A special feature of the invention resides in utilizing the spaced relation produced by the sawing apart of the stone sections for the carrying out of this surfacing operation, in which case the surfacing device is operated in the grooves or cuts made between the sections and the surfacing is therefore accomplished without need for shifting or moving the stone sections from their original position as cut apart. I also contemplate the carrying on of the surfacing operation contemporaneously or simultaneously with the sawing operation.

The surfacing device which I propose to use in the carrying out of my invention consists of a pair of bands which are pressed apart by suitable springs to cause them to simultaneously act upon two opposing faces of stone. These bands may be made of iron or steel and the spring necessary to force them apart may be provided by striking up spring tongues or fingers out of the metal of the bands. The smoothing action may be provided by facing the bearing surface of these bands with an abrasive substance, such as powdered carborundum, or a loose abrasive, such as sand may be introduced in between the stone surfaces while the surfacing device is working. The action of this device is to produce a so called "honed" surface. To produce a polished surface my invention contemplates the covering of the bearing faces of the device with a polishing material such as felt.

Other features will become apparent as the specification proceeds.

The drawings illustrate several forms of apparatus by which different steps of the invention may be carried out.

Figure 1, is a side elevation of a machine embodying the invention and intended for surfacing the stone sections after they have been cut apart by a suitable stone saw. Fig. 2, is a vertical sectional view of the same taken substantially on the plane of the line 2—2 of Fig. 1. Fig. 3, is a horizontal sectional view taken through the block of stone on a plane above the saw blades in Fig. 1. Fig. 4, is a longitudinal sectional view of a machine on the order of that shown in Fig. 1, illustrating a form of the invention in which the surfacing operations known as "honing" and "polishing" are carried on contemporaneously with the sawing or cutting apart of the stone sections. Fig. 5, is a detail sectional view of a surfacing device like that shown in the first three figures. Fig. 6, is a fragmentary sectional view of a form of surfacing device used for producing polished surfaces. Fig. 7, is a detail view of a combined sawing and surfacing device.

One method of carrying out the invention is to surface the sections of stone after the sawing operation has been completed and while the sections still occupy their original spaced relation as cut apart upon the sawing bed. This relation of the stone sections is indicated in Fig. 1 wherein 10 designates the block of stone, such as marble, which has been cut apart by a suitable stone saw or similar device into slabs or sections 11 which are spaced apart by the cuts or grooves 12 separating them from each other. The block of stone rests upon a suitable bed 13 which for the purpose of facilitating the transfer of the stone from one place to another is usually in the form of a car, substantially as indicated. This may be accomplished by discontinuing the sawing or cutting operation when part way through the block so as to leave uncut portions 14 at the bottoms of the grooves which unite the different sections.

The surfacing device may be of any suitable construction and it is here shown in the form of a pair of spaced metallic bands or strips 15 which are pressed apart by suitable tension means, such means in this particular instance taking the form of integral spring tongues or fingers 16 which are struck up out of the metal of the bands. The tension means forces the bands apart so as to hold them in yielding engagement with the opposite walls of stone. To provide the necessary abrading and smoothing action, a loose abrasive, such as sand may be introduced in the groove in which the surfacing device is working. I prefer however to carry the abrasive direct in the bearing surface of the surfacing device. Thus in the detail view, Fig. 5, I have shown at 17 how an abrasive substance, such as carborundum, may be fixed on the surfacing device by embedding it in the form of a powder in the bearing faces of the bands 15. The surfacing device may be made of any convenient width—preferably as wide as the slot is deep so as to operate upon the full depth of the slot at once (see Figs. 1 and 3). Motion is imparted to the surfacing device by suitable means. In the case illustrated the surfacing bands are stretched in a frame 18, to which a reciprocating motion is imparted from a crank 19, through the medium of a pitman 20.

The saws are usually arranged in gangs so as to make a plurality of cuts at once and the surfacing bands are preferably similarly grouped. Thus in the illustration there are ten surfacing members to engage in as many saw cuts. The frame 18 is shown made in open rectangular form (indicated in Fig. 1) like an ordinary gang saw frame, the surfacing bands being secured in this frame by suitable means such as the rods 21. Means such as the adjustable bolts 22 may be provided for giving the proper tension to the bands. The raising and lowering of the surfacing bands in the grooves or cuts may be provided for by suspending the frame from the adjustable supports 23, on swinging links 24, the adjustment of the supports 23, being accomplished in the case illustrated by the turning of the screw spindles 25.

The operation will be clear from the foregoing discription. After the sections of stone have been wholly or partially severed from each other, the saws or other cutting devices may be withdrawn and the surfacing devices be inserted in the grooves left by the saws. Then by operating the surfacing device in these grooves the opposing faces of the adjoining stone sections forming the walls of the grooves are brought to relatively smooth surfaces. Water may be fed into the grooves during this surfacing operation. When, as in the case illustrated, the work is done on the same bed on which the stone has been sawed and without displacement of the stone sections, the power mechanism for the saw may be utilized for the surfacing operation by simply substituting the surfacing bands for the saw blades or bands, the two sets of bands being for this purpose made so as to be interchangeable in the same frame.

Instead of substituting one set of bands for the other in the same frame, I may provide separate frames, one carrying a gang of saw blades and the other carrying a gang of surfacing members spaced according to the spacing of the saws. In this event when the sawing is completed, the gang of saws will be removed and the gang of surfacing members be substituted in its stead. Where it is desired to keep the sawing machine continually at its sawing work, the surfacing will be carried on in an entirely separate machine. In this case after the stone has been sawed the car carrying the stone is simply shifted on its track 26 to carry the stone into position in the separate surfacing machine.

After the sections of stone have been surfaced or "honed" as it is called, they may be given a final finish or polish by using a surfacing device adapted to that particular purpose. Such a device is illustrated in Fig. 6. Here the spaced spring bands 15 are employed as before but in this case the bands are faced with layers 27 of felt or other polishing material. This band is used in the same way as the primary surfacing band except that in this case the abrasive is not needed. Water is however, ordinarily necessary to prevent overheating and burning of the polishing material.

It will be seen that by surfacing the opposing faces of the adjoining sections of stone, each section, excepting the two outside sections will have both its faces properly surfaced and this without need for moving the sections from the position which they originally occupied. When as in the case illustrated in Fig. 2, the sections are held united at one end by an uncut portion, they may be afterward separated from each other in any suitable way.

When operating upon an easy cutting stone or when using a fast cutting saw it is possible to carry on the surfacing operation contemporaneously with the sawing or cutting apart of the stone sections. This effects a great saving in time. Fig. 4, illustrates one form of apparatus for carrying out this combined process of sawing and surfacing. There the numeral 28 indicates a supporting frame in which there is secured first a saw band 29 above which there is a primary surfacing member 30, and above this there is a polishing member 31. In this particular instance, the three operations of sawing, honing and polishing are performed contemporaneously. The block of stone may, in this case, be supported upon plaster blocks 32, or similar material which by permitting the saw to cut readily therethrough will allow the saw and the first surfacing band to pass down far enough to allow the polishing band to finish the bottom portion of the cut. It will be evident that when it is desired simply to hone the stone surface, the polishing band need not be used.

I also contemplate the simultaneous cutting apart and surfacing of the stone by one and the same device. I have illustrated such a device in Fig. 7 wherein the metallic band 33, carries an abrasive material 34 in its edge to perform the sawing function and abrasive material 35 on its opposite faces to surface the side walls of the groove as fast as the sawing proceeds.

What I claim is:—

1. In stone surfacing apparatus, a surfacing member provided with rubbing surfaces on the opposite faces thereof, means for operating the said member between the opposing faces of two adjoining sections of stone and spring means for forcing the rubbing surfaces on said surfacing member into yielding engagement with the opposing faces of the adjoining stone sections.

2. In stone surfacing apparatus, a surfacing member, rubbing material on the opposite faces of the said surfacing member, means for operating the surfacing member between the opposing faces of two adjoining sections of stone and spring means forcing the rubbing surfaces of said member into yielding engagement with the opposing faces of the stone sections.

3. In a stone sawing machine, a saw frame, means for reciprocating said frame, a saw carried by the frame, surfacing means carried by the saw frame above the saw and spring means forcing said surfacing means into yielding engagement with the opposite walls of the groove cut by the saw.

4. Stone surfacing apparatus comprising a pair of bands, tension means forcing said bands apart whereby to hold them in engagement with the opposing faces of two adjoining sections of stone, and means for imparting movement to said bands whereby to simultaneously operate upon the opposing faces of the stone sections.

5. Stone surfacing apparatus comprising a pair of metallic bands arranged back to back and carrying a powdered abrasive on their outer faces, tension means between the bands for forcing the abrading faces of the bands into engagement with the opposing faces of two adjoining stone sections and means for imparting movement to the bands to thereby simultaneously operate upon the opposing faces of the stone sections.

6. In stone surfacing apparatus, a pair of metallic bands arranged back to back, integral spring tongues bent back from each band into engagement with the other band to thereby force the bands apart with spring tension, and means for operating the bands between the opposing faces of two adjoining sections of stone.

ALLSTON SARGENT.

Witnesses:
　PHILIP S. McLEAN,
　E. BRADFORD.

Copies of this patent may be obtained for five cents each, by addressing the "Commissioner of Patents, Washington, D. C."